United States Patent [19]

Bierhoff et al.

[11] Patent Number: 4,704,619

[45] Date of Patent: Nov. 3, 1987

[54] PRINTER COMPRISING A PRINTING HEAD GUIDED BY ROLLERS

[75] Inventors: Waltherus C. J. Bierhoff; Johannes C. A. Muller, both of Eindhoven, Netherlands

[73] Assignee: U.S. Philips Corporation, New York, N.Y.

[21] Appl. No.: 921,874

[22] Filed: Oct. 21, 1986

Related U.S. Application Data

[63] Continuation of Ser. No. 810,881, Dec. 17, 1985, abandoned, and a continuation of Ser. No. 669,277, Nov. 7, 1984, abandoned.

[30] Foreign Application Priority Data

Sep. 3, 1984 [NL] Netherlands ........................ 8402679

[51] Int. Cl.[4] ............................................. G01D 15/16

[52] U.S. Cl. ........................... 346/139 R; 346/76 PH; 346/139 C; 400/120

[58] Field of Search .......... 346/76 PH, 139 C, 139 R; 400/120

[56] References Cited

U.S. PATENT DOCUMENTS

| | | | |
|---|---|---|---|
| 2,415,229 | 2/1947 | Young | 346/139 R |
| 2,936,208 | 5/1960 | Lupish | 346/139 R |
| 4,088,867 | 5/1978 | Levene | 219/216 X |

*Primary Examiner*—E. A. Goldberg
*Assistant Examiner*—Gerald E. Preston
*Attorney, Agent, or Firm*—David R. Treacy

[57] ABSTRACT

A printer having a printing head (3) which is secured to a holder (1) and which is movable in a reciprocating manner along an information carrier, the holder (1) engaging with resilient force a first roller (55) and a second roller (57). The rollers (55 and 57) move over two fixedly arranged roll surfaces (59 and 61), as a result of which a guidance substantially without friction of the holder (1) with the printing head (3) is obtained.

10 Claims, 5 Drawing Figures

PRINTER COMPRISING A PRINTING HEAD GUIDED BY ROLLERS

This is a continuation of application Ser. No. 810,881, filed Dec. 17, 1985, now abandoned, and 669,277, filed Nov. 7, 1984, now abandoned.

BACKGROUND OF THE INVENTION

The invention relates to a printer comprising a holder for a printing head performing a translation defined by at least two bearings and an information carrier displaceable along the printing head.

In a known printer of this kind (see British Patent Specification No. 1,602,347), a number of holders with so-called thermal printing heads are secured on a carriage, which is guided near its two ends in two sliding bearings.

A disadvantage of the known printer is that even with ideally constructed sliding bearings, a considerable amount of friction occurs, which finally leads to clearance in the sliding bearings. This clearance causes a deterioration of the printing quality because the image elements formed are no longer located at a uniform relative distance on the information carrier. Furthermore, removal of the carriage from the sliding bearings is comparatively cumbersome. Moreover, the use of lubricants in the sliding bearings is necessary.

SUMMARY OF THE INVENTION

The invention has for its object to provide a printer having an improved mounting for the printing head holder.

In a printer according to the invention the holder engages, with resilient force, a first roller and a second roller located at a certain distance from the first roller. Each roller moves over two fixedly arranged roll surfaces.

By the use of at least two rollers for guiding the holder in the direction of translation, in this direction a bearing substantially without friction is obtained. Such a bearing can additionally be manufactured in a very simple manner in mass production, and permits rapid removal of the holder for maintenance or replacement by unskilled persons. Due to the rolling compact between the holder and the rollers, the use of lubricants has become superfluous.

A particular embodiment of the printer with a comparatively low roll pressure of the rollers is further characterized in that the holder also engages a third roller which is located between the first roller and the second roller, and which is guided along a third roll surface constituted by a flat edge of a window formed in the holder and a fourth roll surface constituted by a blade spring extending in a flat plane and arranged parallel to the three aformentioned roll surfaces.

A preferred embodiment of the printer is further characterized in that the holder has a flat major portion, and is displaceable and rotatable in a fixedly arranged gap-shaped bearing, while the first, second and third roll surfaces are located in the same plane. Due to the fact that the first, second and third roll surfaces are located in the same plane, the holder can tilt in the gap-shaped bearing about two orthogonal tilting lines with a minimum of friction. In an ideal construction the friction is reduced to zero.

A further embodiment of the printer is characterized in that the blade spring is passed through the window of the holder, a first half of the blade spring being located on one side of the holder and a second half of the blade spring being located on the other side of the holder.

Due to the blade spring being located on both sides of the holder, a very compact construction is obtained and small tilting movements of the holder are possible both about an axis parallel to the direction of translation and about an axis at right angles thereto.

A still further embodiment of the printer is characterized in that the major portion of the holder is a flat plate, the blade spring being located symmetrically to the central plane of the holder, while the central plane of the blade spring is at right angles to the central plane of the holder.

Since the roll forces lie in the same plane, no forces at right angles to the place of the holder are produced, which could lead to an undesired tilting movement of the holder.

The invention will be described more fully with reference to the drawing.

DESCRIPTION OF THE PREFERRED EMBODIMENTS

Figure 1:
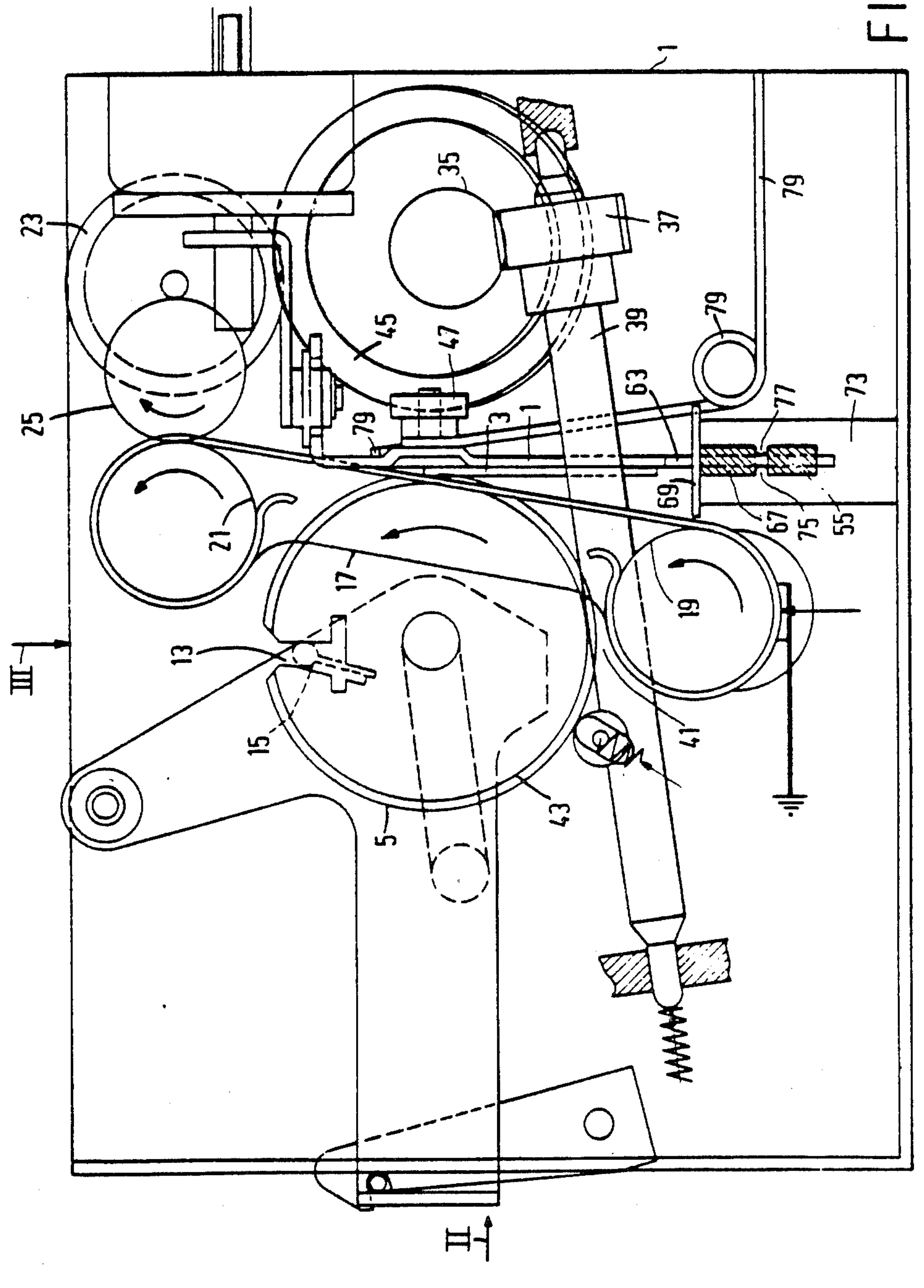
FIG. 1 is a diagrammatic, partly sectional side elevation of the printer.
Figure 2:
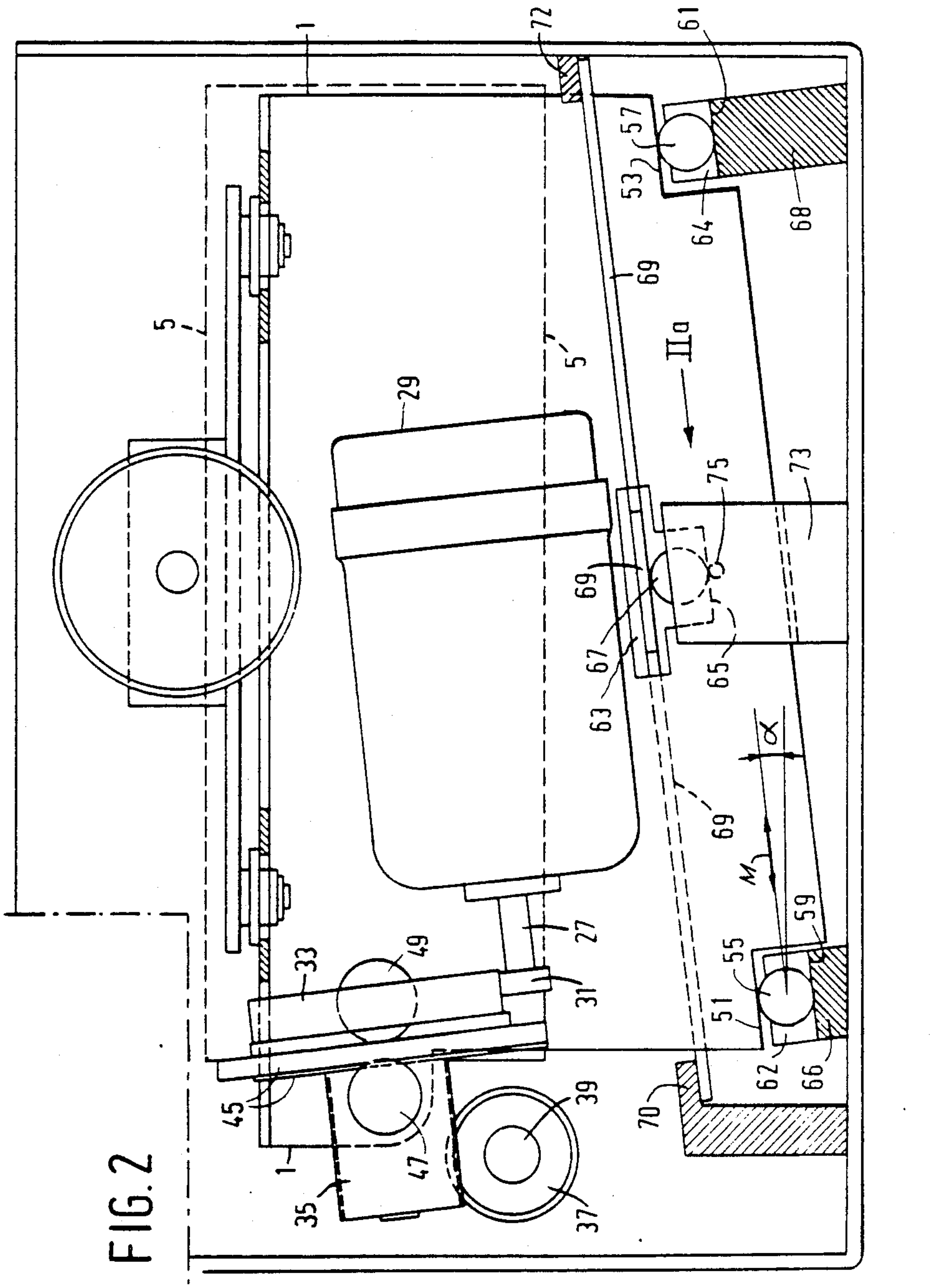
FIG. 2 is a diagrammatic, partly sectional elevation taken on the arrow II in FIG. 1.
Figure 2A:
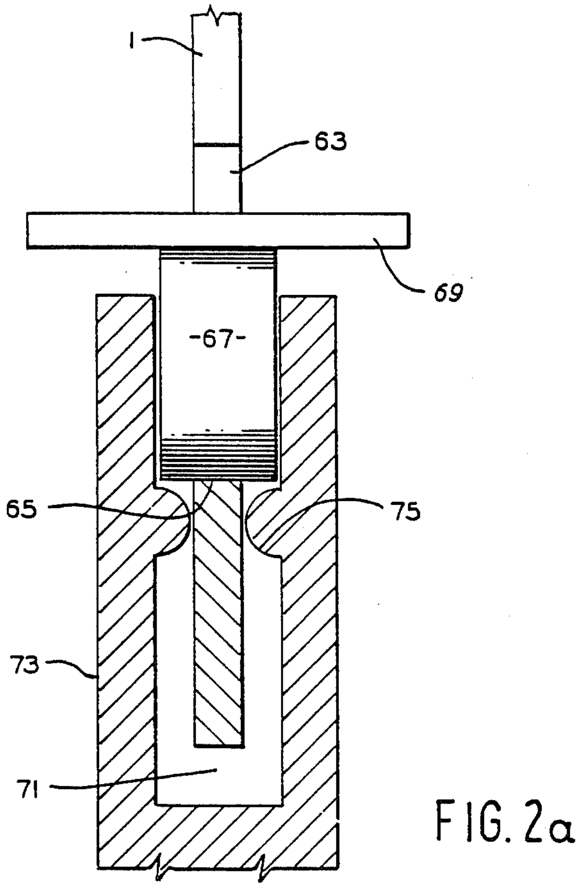
FIG. 2*a* is a section taken on the arrow IIa in FIG. 2.
Figure 3:
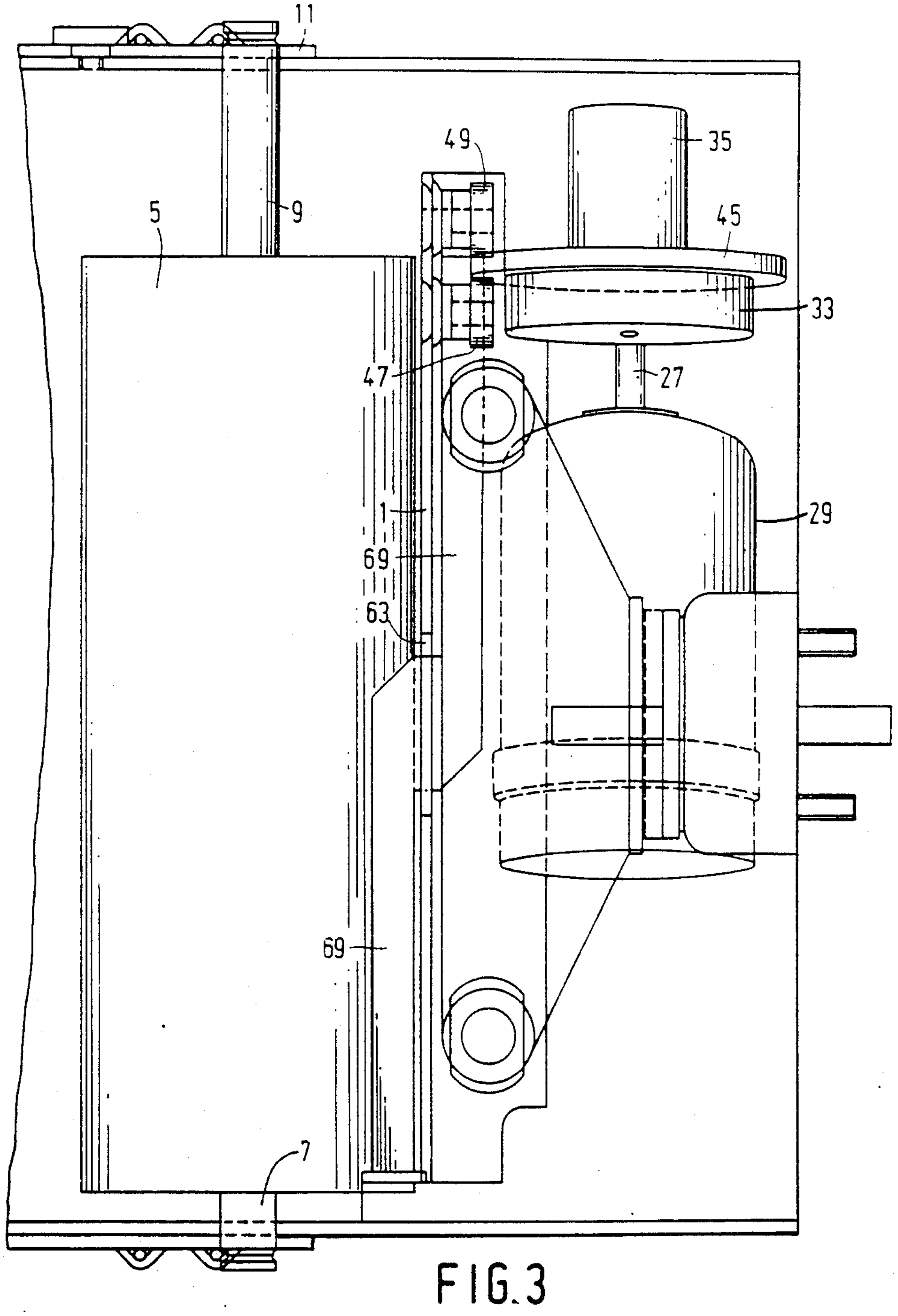
FIG. 3 is a diagrammatic plan view taken on the arrow III in FIG. 1.

The printer illustrated in FIGS. 1, 2 and 3 is a so-called thermal printer comprising a thermal printing head 3, which is secured on a holder 1 and which is provided with known printing members (not shown), which are in the form of resistance elements. These resistance elements are provided on the printing head 3 by means of so-called planar techniques.

The printing head 3 is arranged opposite a rotatable circular-cylindrical anvil 5, which is journalled with stub shafts 7 and 9 (see FIG. 3) in a frame 11. The anvil 5 is provided with a longitudinal slot 13, in which a sheet of paper (information carrier) can be clamped by means of a clamping mechanism 15 (see FIG. 1). The paper rotates during printing together with the anvil 5 along the printing head 3. The printer is further provided with a cassette 17, in which a ribbon or strip with color material is situated which is wound off a supply reel 19 and is wound onto a take-up reel 21. The take-up reel 21 is driven by an electric motor 23, which rotates the take-up reel 21 via a friction roller 25.

A motor shaft 27 of an electric motor 29 has secured on it a pinion 31 which is in engagement with a gear wheel 33. The gear wheel 33 is integral with a first worm 35, which is in turn in engagement with a worm wheel 37. This worm wheel 37 is located on an intermediate shaft 39 with a second worm 41 which is in engagement with a second worm wheel 43 which is rigidly coupled with the anvil 5. Like with the first worm 35, the gear wheel 33 is further integral with a cam disk 45, against which are guided two rollers 47 and 49 secured to the holder 1 in order to obtain a reciprocating translation movement of the holder 1 with the printing head 3. The rotation of the anvil 5 and the translation of the printing head 3 are consequently synchronized mechanically. With the printer described so far, colour images are printed in a well-known manner on the information carrier. For the sake of brevity, the principle of the formation of a color image is not explained further.

As shown in FIGS. 1 and 2, the major portion of the holder 1 is a flat plate having two flat edges 51 and 53 which engage two disk-shaped rollers 55 and 57 (first and second rollers). The rollers 55 and 57 move over two roll surfaces 59 and 61 (first and second roll surfaces) formed by stepped recesses 62 and 64 in blocks 66 and 68 secured to the frame 11. A window 63 formed in the holder 1 has a flat edge 65 (third roll surface) which is engaged by a third disk-shaped roller 67.

The edges 51, 53 and 65, and the surfaces 59 and 61 are all parallel to a line tilted at an acute angle $\alpha$ with respect to the axis of the anvil 5, and define a direction of oscillatory translation M of the holder 1. Thus, as the paper moves over the anvil and the holder moves in the direction M, printing occurs in a straight line parallel to the anvil axis. The roller 67 in turn engages a blade spring 69 and is therefore enclosed between the flat edge 65 and the blade spring 69 (fourth roll surface) in a direction at right angles to the direction of translation $\alpha$ of the holder 1 (see FIG. 2). Thus the holder 1 is therefore guided in the direction of translation between the rollers 55 and 57 and the third roller 67. The blade spring 69 is passed through the window 63 (see FIG. 3) and is located symmetrically with respect to the plate-shaped holder 1. One half of the blade spring 69 is situated on one side of the holder 1, while the other half of the blade spring 69 is situated on the other side of the holder 1. Near its two ends the blade spring presses against supports 70 and 72 connected to the frame 11. The central plane (viewed in the direction of thickness) of the blade spring is at right angles to the central plane (viewed in the direction of thickness) of the major flat portion of the holder 1.

In a direction at right angles to that plane of the holder 1, the holder is further guided in a gap 71 of a bearing block 73 (gap bearing) secured to the frame 11. The gap 71 is provided with strongly curved boundary walls 75 and 77 in order to obtain the smallest possible amount of friction with the holder 1. Due to the curved boundary walls 75 and 77, the holder 1 can also be subjected to a small tilting movement about an axis through the center of the gap 71 and parallel to the direction of translation M of the holder 1. The first, second and third roll surfaces 59, 61 and 65 are located in a straight line in the same plane, as a result of which two orthogonal tilting movements are possible for the holder 1 in the gap bearing 73.

The friction between the roller 67 and the third roll surface 65 is equal to zero with an accurate construction of the gap bearing 73. In the bearing block 73 contact roller can be provided for a further reduction of the friction with the holder 1. In the mounted state the blade spring 69 lies in a flat plane and pushes with a small force against the roller 67. The forces exerted by the rollers 55, 57 and 67 on the holder 1 are indicated in FIG. 2 by arrows. The small force exerted by the blade spring 69 on the roller 67 can be readily obtained by using a blade spring which is slightly curved in the demounted state. Any clearances in the bearing of the holder 1 are thus avoided in a simple manner. Due to the small displacement of the holder 1 in the direction of translation M, the pressure force of the blade spring 69 remains substantially constant also during printing. The rollers 55, 57 and 67 perform during printing a rolling movement over the roll surfaces 59 and 61 and the flat edge 65, respectively. The rolling movement of the rollers 55, 57 and 67 occurs also over the flat edges 51 and 53 and the side of the blade spring 69 facing the bearing block 73, respectively.

As stated above, the holder 1 can be subjected to a small tilting movement in two orthogonal directions. As a result, the planar printing members on the printing head 3 can follow smoothly the thickness variations of the information carrier and the color material strip occurring in practice. In fact the holder 1 is urged in a direction at right angles to the plane of the holder against the strip with color material, the information carrier and the anvil by means of a wire spring 79, which bears near its one end on the holder 1 and is secured near its other end to the frame 11 (see FIG. 1). The length of the spring 79 is so great that the prestress varies only slightly during the translation of the holder 1.

Figure 4:
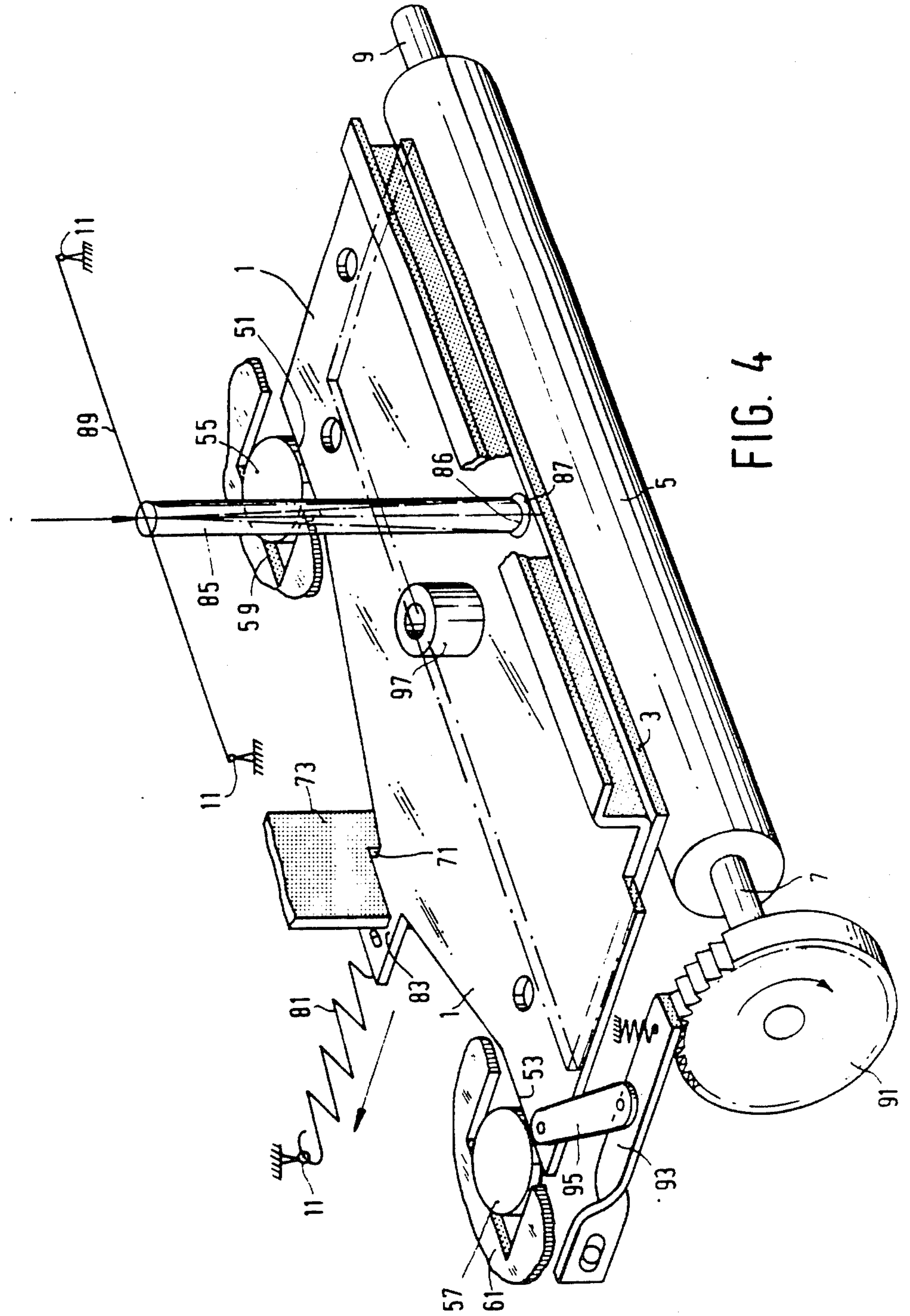
FIG. 4 is a diagrammatic perspective view of an alternative printer according to the invention.

In the further embodiment of the printer shown in FIG. 4, reference numerals corresponding to those in FIGS. 1, 2 and 3 are used as far as possible. The holder 1 is guided in this case along two instead of along three disk-shaped rollers; that is, along the rollers 55 and 57. In order to obtain a guidance free of clearance, the flat edges 51 and 53 of the holder 1 are pulled against the rollers 55 and 57 by a comparatively long helical spring 81, which is secured near its one end to the holder 1 and is secured near its other end to the frame 11, as shown diagrammatically. The length of the helical spring 81 is chosen so that the tensile force of the spring varies only very slightly during the translation of the holder 1 when printing. The holder 1 is provided with a tab 83 which is supported in the gap 71 of the bearing block 73. In this manner, the holder 1 can perform a small tilting movement about an axis parallel to the direction of translation of the holder, just as in the first embodiment.

The printing head 3 with planar resistance elements is urged by means of a circular rod 85 which is pressed with one end 86 into a cup-shaped bearing 87 in the holder 1 by means of a pre-stressed wire spring 89. The wire spring 89 is secured near its both ends in the frame 11. Since the rod 85 is comparatively long and the translation of the holder 1 takes place over a comparatively small distance, the pressure force of the rod 85 remain substantially constant during printing. Also in this embodiment, the holder 1 can consequently be subjected to a small tilting movement about two perpendicular axes.

In this case, the anvil 5 is driven intermittently by means of a known pawl-wheel mechanism. A pawl wheel 91 secured on the stub shaft 7 is rotated stepwise by a pawl 93, which is secured by means of a rod 95 to the holder 1. The translation of the holder 1 is therefore mechanically synchronized with the intermittent rotation of the anvil 5. The holder 1 can be provided with a cam follower 97 which moves over a cam disk not shown.

Although the invention is described with reference to a thermal printing head, it is not limited thereto. In principle, printing heads may be used which need not be urged against the anvil 5, such as, for example, a so-called laser printing head, an ink-jet printing head or a printing head with electromagnetically or electrodynamically driven impact members. The resilient pressure in a direction at right angles to the information carrier is then absent and is replaced by a fixed arrangement in this direction. The roller guidance in the direction of translation according to the invention is of course maintained. An electrostatic printing head may also be used. Such a printing head may engage the information carrier. The invention may also be used both in black-and-white printers and in color printers. The translation movement of the holder 1 may be obtained in many ways, for example, by crank mechanisms and eccentric mechanisms. The movements of the holder 1 and the anvil 5 can be obtained by separate drives which are electronically synchronized. Instead of a rotatable cylindrical anvil, a non-cylindrical stationary anvil may be used. The information carrier may finally be driven separately instead of by a rotatable anvil.

What is claimed is:

1. A printer for printing on an information carrier, comprising a support frame, an anvil mounted in said support frame, a printing head arranged opposite said anvil such that said information carrier is displaceable therebetween, a holder on which said printing head is mounted, first and second rollers engaged by said holder with resilient force, means for producing said resilient force, and first and second roll surfaces fixedly connected to said frame for guiding said first and second rollers respectively during rolling thereof, said rollers and roll surfaces being arranged such that said holder is displaceable relative to said frame in a direction aligned with respect to said anvil as said rollers roll over said respective roll surfaces.

2. The printer according to claim 1, further comprising a third roller, wherein said means for producing said resilient force comprises a blade spring extending in a plane, and said third roller is located between said first and second rollers and is guided between a third roll surface constituted by a flat edge of a window formed in said holder and a fourth roll surface constituted by said blade spring.

3. The printer according to claim 2, further comprising a fixed bearing having a gap in which said holder is displaceably and rotatably mounted.

4. The printer according to claim 2, wherein said first, second and third rollers roll in substantially the same plane.

5. The printer according to claim 2, wherein said blade spring is passed through the window of said holder, a first half of said blade spring being located on one side of said holder, and a second half of said blade spring being located on the other side of said holder.

6. The printer according to claim 5, wherein said holder has a flat major portion and said blade spring is located symmetrically with respect to the central plane of said flat portion, the central plane of said blade spring being substantially perpendicular to the central plane of said holder.

7. The printer according to claim 1, wherein said printing head comprises a plurality of planar thermal printing members and is rotatable about an axis substantially parallel to said longitudinal axis, said printing members resiliently engaging an information carrier supported by said anvil during printing.

8. A printer for printing on an information carrier, comprising a support frame, an anvil mounted in said support frame, a printing head arranged opposite said anvil such that said information carrier is displaceable therebetween, a holder on which said printing head is mounted, and means for guiding said holder for movement with respect to said anvil, wherein said means comprises first and second flat edges on said holder, aligned to define a direction of oscillatory translation aligned with respect to said anvil; and first and second roll surfaces fixedly connected to said frame, respectively parallel to said first and second edges, first and second rollers respectively arranged between one of said edges and the respective roll surface, and means for resiliently urging said first and second edges toward said first and second roll surfaces so as to engage the respective rollers.

9. The printer according to claim 8, wherein said anvil has a longitudinal axis, and said direction of oscillatory translation is tilted at an acute angle with respect to said axis.

10. The printer according to claim 9, wherein said holder has a third edge, said edges lying in a straight line, and the printer comprises a third roller disposed to an opposite side of said line from said first and second rollers, said third roller engaging said third edge and forming part of said means for resiliently urging.

* * * * *

UNITED STATES PATENT AND TRADEMARK OFFICE
CERTIFICATE OF CORRECTION

PATENT NO. : 4,704,619

DATED : November 3, 1987

INVENTOR(S) : WALTHERUS C.J. BIERHOFF ET AL

It is certified that error appears in the above—identified patent and that said Letters Patent is hereby corrected as shown below:

Column 3, line 21, "enclosed" should read --captured--

Column 3, line 24, "$\alpha$" should read --M--

Claim 7, line 4, "longitudinal axis" should read --anvil--

Signed and Sealed this

Twenty-eighth Day of February, 1989

*Attest:*

DONALD J. QUIGG

*Attesting Officer* *Commissioner of Patents and Trademarks*